(12) United States Patent
MacGougan et al.

(10) Patent No.: US 12,228,655 B1
(45) Date of Patent: Feb. 18, 2025

(54) SYSTEMS AND METHODS FOR SHARED ANTENNA TUNING

(71) Applicant: Apple Inc., Cupertino, CA (US)

(72) Inventors: Glenn D. MacGougan, San Jose, CA (US); Aditya N. Srivastava, Fremont, CA (US); Harsha Shirahatti, Santa Clara, CA (US); Madhusudan Chaudhary, Campbell, CA (US); Ozgur Ekici, Ottawa (CA); Sachin J. Sane, San Jose, CA (US); William J. Bencze, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 17/668,828

(22) Filed: Feb. 10, 2022

Related U.S. Application Data

(63) Continuation of application No. 17/321,171, filed on May 14, 2021, now abandoned.

(51) Int. Cl.
  *G01S 19/23* (2010.01)
  *G01S 19/20* (2010.01)
  *G01S 19/24* (2010.01)
  *H01Q 1/24* (2006.01)

(52) U.S. Cl.
  CPC ............ *G01S 19/235* (2013.01); *G01S 19/20* (2013.01); *G01S 19/24* (2013.01); *H01Q 1/241* (2013.01)

(58) Field of Classification Search
  CPC ........ G01S 19/235; G01S 19/20; G01S 19/24; H01Q 1/241
  See application file for complete search history.

(56) References Cited

U.S. PATENT DOCUMENTS

| | | | |
|---|---|---|---|
| 8,514,798 B2 * | 8/2013 | Lee ................... | H04B 1/406 370/338 |
| 9,716,521 B2 * | 7/2017 | Alriksson ............. | H04W 52/52 |
| 11,921,225 B1 * | 3/2024 | Bench ....................... | H03F 3/19 |
| 2002/0107033 A1 | 8/2002 | Kim | |
| 2003/0054775 A1 | 3/2003 | Eaves et al. | |

(Continued)

FOREIGN PATENT DOCUMENTS

| | | | | |
|---|---|---|---|---|
| CH | 716382 A2 * | 1/2021 | ........... | A61B 5/1118 |
| WO | 03047035 A1 | 6/2003 | | |
| WO | WO-2018112347 A1 * | 6/2018 | ............. | B63B 22/00 |

*Primary Examiner* — Vladimir Magloire
*Assistant Examiner* — Maxine McKenzie Phillips
(74) *Attorney, Agent, or Firm* — Fletcher Yoder, P.C.

(57) ABSTRACT

This disclosure is directed to shared antenna tuning. An electronic device may receive a global navigation satellite system (GNSS) tune request to tune a shared antenna to a GNSS signal frequency. The electronic device may then tune the antenna to the GNSS signal frequency and enable a GNSS receiver. The electronic device may also receive a cellular tune request to tune the antenna to a cellular frequency. The electronic device may tune the antenna to a cellular frequency and may deactivate the GNSS receiver or blank the GNSS receiver. In some embodiments, the electronic device may also communicate with a Low Earth Orbit (LEO) satellite. During LEO satellite communication, the electronic device may transmit a signal to blank a GNSS L1 receiver to avoid signal interference with the LEO satellite communication, and activate a GNSS L5 receiver to receive GNSS signals.

20 Claims, 7 Drawing Sheets

(56) References Cited

U.S. PATENT DOCUMENTS

| | | | |
|---|---|---|---|
| 2013/0141275 A1* | 6/2013 | Abraham | G01S 19/37 342/357.23 |
| 2016/0077210 A1* | 3/2016 | Opshaug | G01S 19/29 342/357.4 |
| 2016/0245923 A1* | 8/2016 | Badke | G01S 19/33 |
| 2018/0035444 A1* | 2/2018 | Wu | H04W 52/245 |

* cited by examiner

SYSTEMS AND METHODS FOR SHARED ANTENNA TUNING

CROSS-REFERENCE TO RELATED APPLICATIONS

This application claims priority to U.S. application Ser. No. 17/321,171, entitled "SYSTEMS AND METHODS FOR SHARED ANTENNA TUNING," filed May 14, 2021, the disclosure of which is incorporated by reference in its entirety for all purposes.

BACKGROUND

The present disclosure relates generally to systems and methods for shared antenna tuning in a wireless communication device, and more specifically to controlling transmitters and/or receivers in response to tuning requests received by the wireless communication device.

In a wireless communication device (e.g., a smartphone), one or more antennas may be tuned to desired frequencies based upon tune requests received by the wireless communication device. The wireless communication device may then send or receive signals using a transmitter or receiver coupled to the one or more antennas. In this manner, different signals of different frequencies may be sent from or received by the wireless communication device. However, these sent or received signals may be negatively impacted by attenuation at certain frequencies due to multiple signaling operations being conducted concurrently by the wireless communication device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device includes multiple antennas, a cellular transceiver that sends and receives cellular signals via one or more antennas of the multiple antennas, and a global navigation satellite system (GNSS) receiver that receives GNSS signals via the one or more antennas. The electronic device also includes one or more processors that receive a GNSS tune request to receive the GNSS signals via the one or more antennas at a GNSS signal frequency, and in response to receiving the GNSS tune request, receive the GNSS signals via the one or more antennas at the GNSS signal frequency. The one or more processors also receive a cellular tune request to send or receive the cellular signals via the one or more antennas at a cellular frequency, and, in response to receiving the cellular tune request, deactivate the GNSS receiver, and send or receive, using the cellular transceiver, the cellular signals via the one or more antennas at the cellular frequency.

In another embodiment, an electronic device includes multiple antennas and a first global navigation satellite system (GNSS) receiver that receives GNSS signals via a first set of the antennas of the multiple antennas on a first GNSS frequency band, and a second GNSS receiver that receives GNSS signals via a second set of the antennas of the multiple antennas on a second GNSS frequency band. The electronic device also includes a Low Earth Orbit (LEO) satellite transceiver that sends and receives LEO satellite signals via a third set of antennas of the multiple antennas. The electronic device further includes one or more processors that receive an LEO satellite tune request to send or receive the LEO satellite signals via the third set of antennas at a LEO satellite signal frequency, and, in response to receiving the LEO satellite tune request, blank or deactivate the first GNSS receiver, activate the LEO satellite transceiver, and enable the second GNSS receiver. Additionally, the one or more processors receive an indication that the LEO satellite is out of range, and, in response, to receiving the indication that the LEO satellite is out of range, deactivate the LEO satellite transceiver and enable the first GNSS receiver.

In yet another embodiment, a method includes receiving, at processing circuitry of an electronic device, a global navigation satellite system (GNSS) tune request to receive GNSS signals via one or more antennas of multiple antennas at a GNSS signal frequency and, in response to receiving the GNSS tune request, receiving, using a GNSS receiver of the electronic device, the GNSS signals via the one or more antennas at the GNSS signal frequency. Additionally, the method includes receiving, by the processing circuitry, a cellular tune request to send or receive the cellular signals via the one or more antennas at a cellular frequency. In response to receiving the cellular tune request deactivating the GNSS receiver, and sending or receiving, using a cellular transceiver of the electronic device, cellular signals via the one or more antennas at the cellular frequency.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
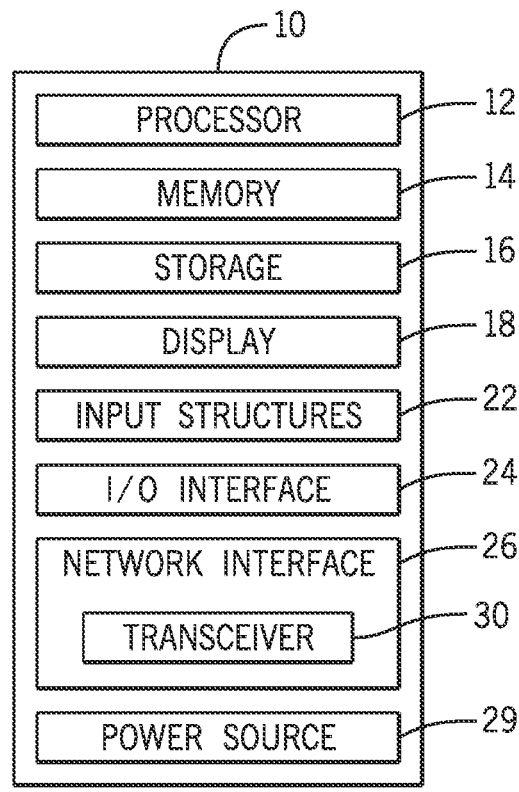
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to antenna tuning for various signal types in electronic devices (e.g., radio frequency communication devices). The electronic device may include one or more shared antennas that may each receive cellular signals and satellite signals in multiple frequency bands. For example, the one or more shared antennas may receive a global navigation satellite system (GNSS) signal transmitted by a GNSS satellite in L1 frequency bands (e.g., centered at 1575.42 MHz) and/or L5 frequency bands (e.g., centered at 1176.45 MHz). In some cases, the shared one or more antennas may be tuned to a cellular frequency, and the GNSS signals in some/all frequency bands may be severely attenuated as a result. For example, the one or more shared antenna may periodically be tuned to cellular bands for cellular paging operations even when there is no cellular operation. This periodic antenna de-tune from GNSS operation to cellular paging operations (e.g., periodic requests (e.g., every 1.28 second) for cellular tuning for a duration of 1 millisecond (ms) to 10 ms may introduce noise into and degrade the GNSS signals. In particular, the GNSS signals may be 20 decibels (dB) below a noise floor of cellular operations without additional de-tuning or de-sensing due to antenna tuning away from a GNSS frequency band. Thus, GNSS processing may be unnecessary and result in unneeded power expenditure without any user benefit.

Additionally, the electronic device may receive low earth orbit (LEO) satellite signals on a LEO transmit frequency band (e.g., 1610-1618.725 megahertz (MHz)) that may interfere with the L1 band for GNSS signal reception. This may result in interference with the GNSS signals received by the one or more antennas on the L1 band. Additionally, governmental bodies and other regulatory bodies may implement restrictions on LEO satellite communication according to certain geographical areas, such as requiring that the electronic device deactivate a LEO transceiver and halt LEO satellite communication in the certain geographical areas.

Embodiments herein provide various apparatuses and techniques to reduce GNSS signal attenuation and unnecessary GNSS receiver power output during shared antenna tuning with cellular operations. To do so, the embodiments disclosed herein include GNSS receiver architecture that enables independent power control for signals received at one or more GNSS receivers. In particular, a GNSS receiver may be deactivated and/or blanked (e.g., the received signals may be "blanked" or replaced with "dummy" signals, such as a signals having only zeroes) when the shared antenna is detuned (e.g., with respect to GNSS) for cellular requests. In this way, attenuation of GNSS signals during cellular operation using the shared antenna may be mitigated or avoided. Moreover, blanking the GNSS receiver, as opposed to deactivating the GNSS receiver, may enable faster activation of the GNSS receiver, thus reducing latency time and excess power output associated with deactivating and activating the GNSS receiver multiple times over short time durations.

Additionally, to address LEO satellite transmission interference with the GNSS signals in the L1 band, the electronic device may deactivate (e.g., shut off or depower) a GNSS L1 receiver during LEO satellite transmissions. That is, the electronic device may determine that a LEO satellite transmission signal is to be received, and deactivate the GNSS L1 receiver for a period of time that the electronic device receives the LEO satellite transmissions. The electronic device may also enable a GNSS L5 receiver so that GNSS signals may continue to be received and processed by the electronic device in the L5 frequency band, which may not interfere with the LEO satellite transmission signal. The electronic device may also enable periodic tracking and updating of a location of the electronic device (e.g., relative to geographical areas where LEO satellite transmissions are not permitted based on territory regulations). The electronic device may initially determine a distance the device is to an area where LEO satellite communication is restricted (e.g., geographical areas where the LEO transceiver of the electronic device should be deactivated). The electronic device may periodically determine the location of the device via receiving GNSS L5 signals, and may increase the frequency of location determination based on the distance to the restricted LEO satellite area decreasing. Accordingly, the electronic device may increase frequency of location determination as the electronic device approaches the restricted LEO use area, and may deactivate the LEO transceiver when the electronic device is within the restricted LEO use area.

With the foregoing in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a 3rd generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas. The power source 29 of the electronic device 10 may include any suitable source of power, such as a rechargeable lithium polymer (Li-poly) battery and/or an alternating current (AC)

power converter. In certain embodiments, the electronic device 10 may take the form of a computer, a portable electronic device, a wearable electronic device, or other type of electronic device.

Figure 2:
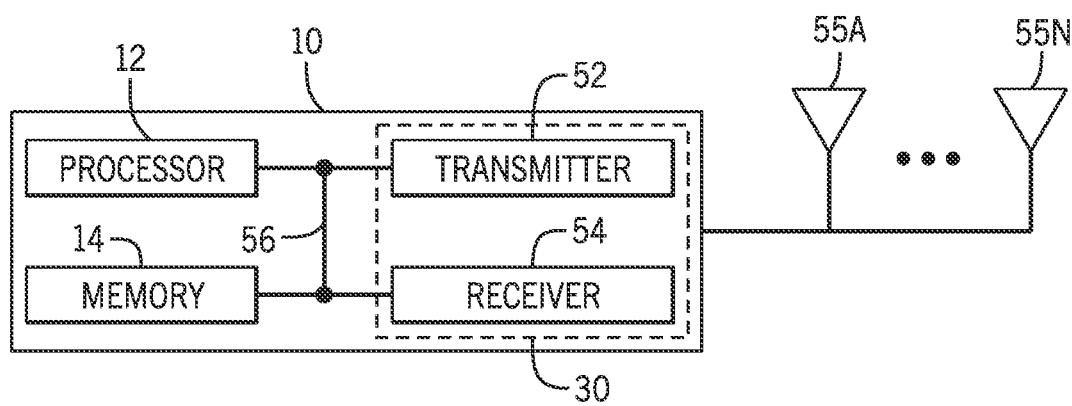
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, the transmitter 52, the receiver 54, and/or the antennas 55 (illustrated as 55A-55N, collectively an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and a remote location via, for example, a network or direction connection associated with the electronic device 10 and an external transceiver (e.g., in the form of a cell, eNB (E-UTRAN Node B or Evolved Node B), base stations, and the like. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards.

The transmitter 52 may wirelessly transmit packets having different packet types or functions. For example, the transmitter 52 may transmit packets of different types generated by the processor 12. The receiver 54 may wirelessly receive packets having different packet types. In some examples, the receiver 54 may detect a type of a packet used and process the packet accordingly. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
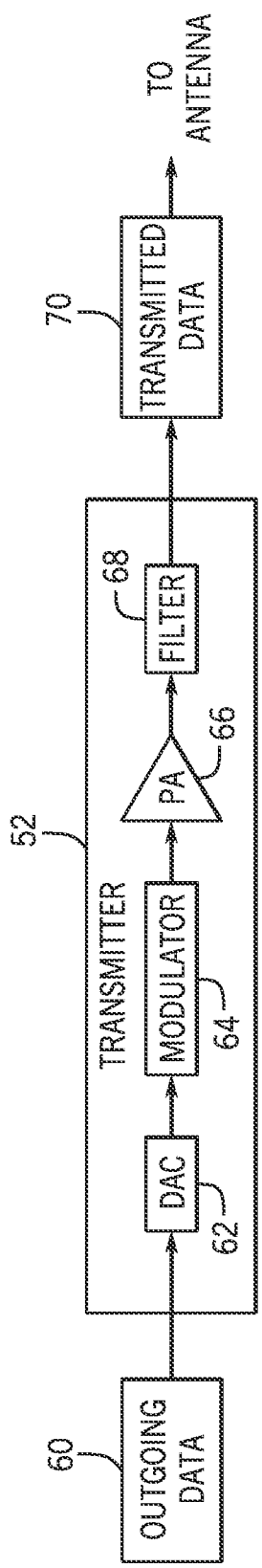
FIG. 3 is a schematic diagram of a transmitter of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
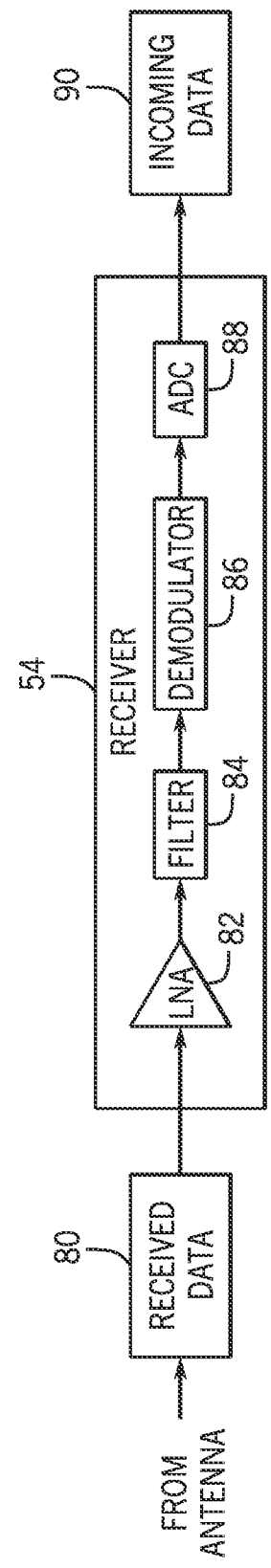
FIG. 4 is a schematic diagram of a receiver of the electronic device of FIG. 1, according to embodiments of the present disclosure.

FIG. 4 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 which are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

As discussed above, the electronic device 10 may include one or more antennas 55 that may receive cellular signals and/or satellite signals in multiple frequency bands. A global navigation satellite signal (GNSS) signal may be transmitted by a GNSS satellite in an L1 frequency bands (e.g., 1575.42 MHz) and L5 frequency bands (e.g., 1,176.45 MHz) and be received by the shared one or more antennas. In some cases, the shared one or more antennas are tuned to a cellular frequency and the GNSS signals in some/all frequency bands may be severely attenuated as a result of antenna tuning operations corresponding to cellular connected modes (e.g., Voice over Long-Term Evolution (VOLTE) calls, video streaming) and/or cellular paging operations. That is, the GNSS signals may have signal quality values below a GNSS receiver' acquisition and/or tracking threshold signal quality values (e.g., signal quality values used to determine a location of the electronic device 10). Thus, GNSS processing may be unnecessary and result in unneeded power expenditure without any user benefit.

Figure 5:
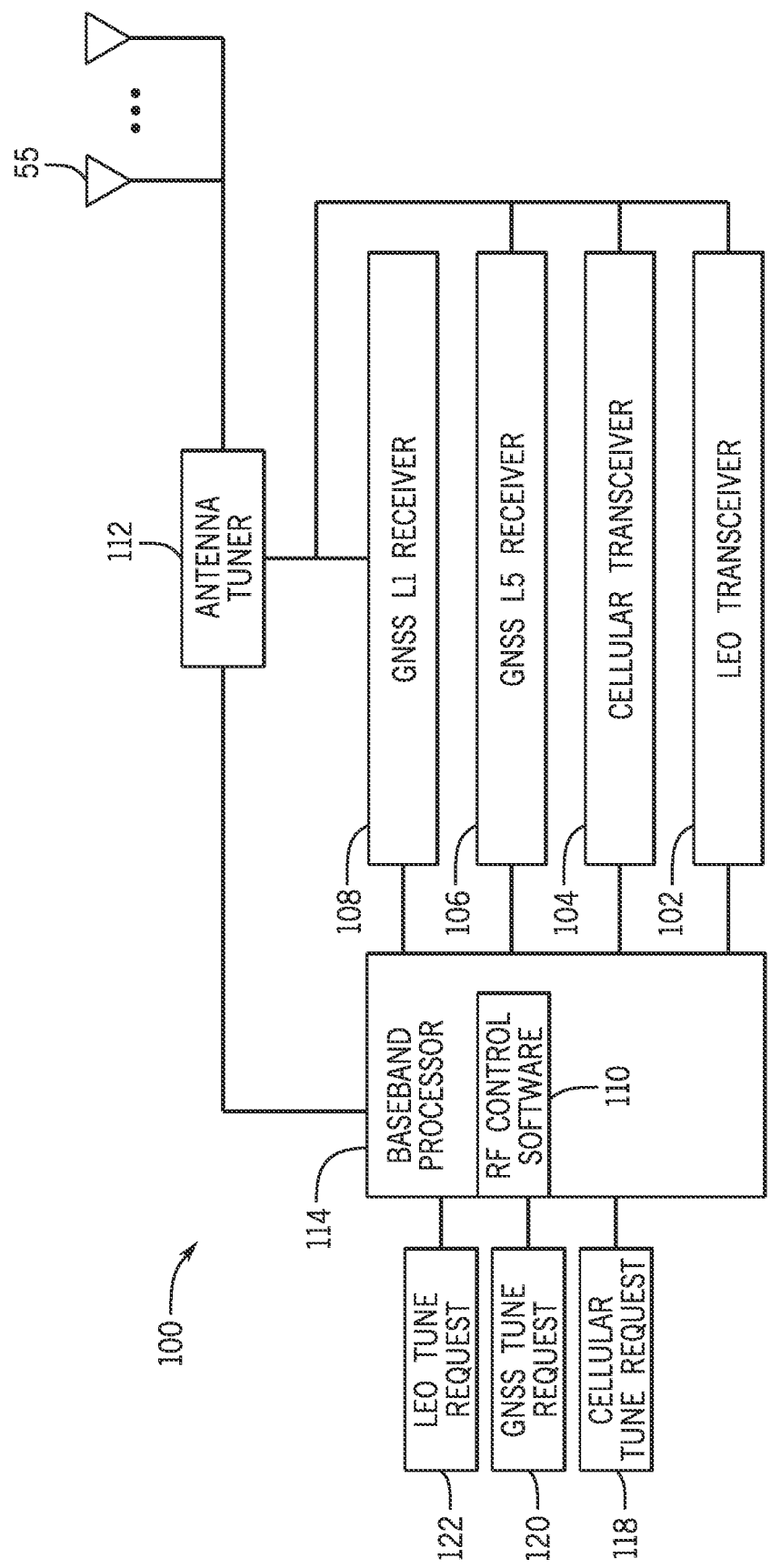
FIG. 5 is a schematic diagram of communication circuitry of the electronic device of FIG. 1, according to embodiments of the present disclosure.

With the foregoing in mind, FIG. 5 is a schematic diagram of communication circuitry 100 of the electronic device 10, according to embodiments of the present disclosure. The electronic device 10 may include a LEO transceiver 102 that enables sending and receiving LEO signals, a cellular transceiver 104 that enables sending and receiving cellular signals, a GNSS L1 receiver 106 that enables receiving GNSS signals on the L1 band, and a GNSS L5 receiver 108 that enables receiving GNSS signals on the L5 band. The communication circuitry 100 may include a baseband processor 114 that utilizes radio frequency (RF) control software 110 to control the one or more receivers and transceivers and an antenna tuner 112 based on one or more tune requests received at the baseband processor 114. The baseband processor 114 may be in the form of the processor 12 described above.

The GNSS L1 receiver 108 and the GNSS L5 receiver 106 may include the components of the receiver 54 discussed in FIG. 4 to receive GNSS L1 band signals and GNSS L5 band signals, respectively. The cellular transceiver 104 may include the components of the transceiver 30 described in FIG. 2, including those of the transmitter 52 and the receiver 54 of FIGS. 3 and 4, to transmit and receive cellular signals. The LEO transceiver 102 may also include the components of the transceiver described in FIG. 2, including those of the transmitter 52 and the receiver 54 of FIGS. 3 and 4, to transmit and receive LEO satellite signals. The receivers 106, 108 and the transceivers 102, 104 described above may be coupled to one or more antenna tuners 112 (collectively an antenna tuner 112). The baseband processor 114 may send one or more control signals to the antenna tuner 112 to cause the antenna tuner 112 to tune a resonant frequency of the one or more antennas 55 to send or receive signals efficiently at a desired frequency. The antenna tuner 112 may include any suitable device that may tune the frequency of the one or more antennas 55 to a desired frequency, such as an aperture tuner, an impedance tuner, and so on. The baseband processor 114 may include or execute RF control software 110 that may receiver and/or process tune requests (e.g., a cellular tune request 118, a GNSS tune request 120, and a LEO tune request 122) and determine and/or send control instructions to the antenna tuner 112, the transceivers 102, 104, and/or the receivers 106, 108 based on the received tune requests.

For example, the baseband processor 114 may receive a cellular tune request 118 and a GNSS tune request 120 (e.g., from an application processor, such as the processor 12) along with additional information regarding the tune request (e.g., duration information, cellular operation information). The RF control software 110 may determine that the cellular tune request 118 is for a cellular operation (e.g., Voice over Long-Term Evolution (VOLTE), video streaming) based on the tune request information. Performing the cellular operation may cause GNSS signals received at the shared antenna 55 to be severely attenuated. If in operation, the GNSS L1 and L5 receivers 108, 106 may expend excessive power in an effort to process the attenuated GNSS signals. Accordingly, the RF control software 110 may deactivate or blank (e.g., replace the received GNSS signals with "dummy" signals, such as a signals having only zeroes) the GNSS L1 receiver 108 and/or the GNSS L5 receiver 106 when operating the cellular transceiver 104 (e.g., as indicated by receiving the cellular tune request 118). In some embodiments, the RF control software 110 may determine a cellular frequency for the cellular tune request 118, and determine whether the cellular frequency interferes with GNSS L1 and/or GNSS L5 band signals. If so, the RF control software 110 may deactivate or blank the GNSS L1 receiver 108 and/or the GNSS L5 receiver 106 when operating the cellular transceiver 104. The RF control software 110 may cause the antenna tuner 112 to tune to a desired cellular frequency and cause the cellular transceiver 104 to send or receive cellular signals over the desired cellular frequency when operating the cellular transceiver 104. The RF control software 110 may also cause the antenna tuner 112 to tune to a desired L1 and/or L5 frequency and cause the GNSS L1 receiver 108 and/or the GNSS L5 receiver 106 to receive GNSS signals when operating the GNSS L1 receiver 108 and/or the GNSS L5 receiver 106. The RF control software 110 may thus operate the antenna tuner 112, the cellular transceiver 104, and/or the GNSS L1 receiver 108, the GNSS L5 receiver 106 based on tune requests received at the baseband processor 114. In particular, the RF control software 110 may send instructions to these components to deactivate the components, activate the components, blank signals received by the GNSS L1 receiver 108 and/or the GNSS L5 receiver 106, or the like.

In some embodiments, the baseband processor 114 may receive a cellular tune request 118, but no GNSS tune request 120. Therefore, the baseband processor 114 may utilize the RF control software 110 to cause the antenna tuner 112 to tune to a desired cellular frequency and cause the cellular transceiver 104 to send or receive cellular signals over the desired cellular frequency, but would not cause the GNSS L1 receiver 108 and/or the GNSS L5 receiver 106 to receive GNSS signals, because no GNSS tune request 120 was received at the baseband processor 114, and therefore no processing of the GNSS signals is required. In some embodiments, one or more of the receivers 106, 108 and transceivers 102, 104 shown in FIG. 5 may not be included in the communication circuitry 100. For example, in one embodiment, the communication circuitry 100 may include only the cellular transceiver 104 and a single GNSS receiver (e.g., either the GNSS L1 receiver 108 and/or the GNSS L5 receiver 106). In another embodiment, the communication circuitry 100 may include only the GNSS L1 receiver 108 and/or the GNSS L5 receiver 106 and the LEO transceiver 102. That is, it should be understood that the communication circuitry 100 may include any combination of the receiver 106, 108 and transceiver 102, 104 components depicted in FIG. 5.

Figure 6:
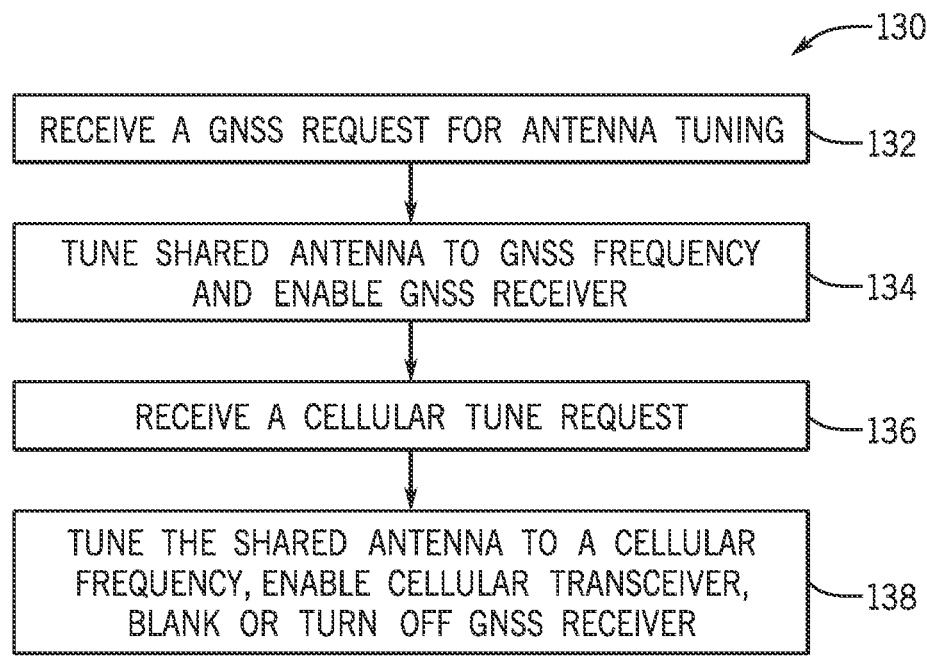
FIG. 6 is a flowchart for tuning an antenna shared by a cellular transceiver and a Global Navigation Satellite System (GNSS) receiver as shown in FIG. 5, according to embodiments of the present disclosure.

Based on the foregoing, FIG. 6 is a flowchart of a method 130 for tuning an antenna 55 shared by the cellular transceiver 104 and a GNSS receiver (e.g., 106, 108) as shown in FIG. 6, according to an embodiment of the present disclosure. Any suitable device (e.g., a controller) that may control components of the electronic device 10, such as the processor 12 (e.g., the baseband processor 114), may perform the method 130. In some embodiments, the method 130 may be implemented by executing instructions stored in a tangible, non-transitory, computer-readable medium, such as the memory 14 or storage 16, using the processor 12. For example, the method 130 may be performed at least in part by one or more software components, such as an operating system of the electronic device 10, one or more software applications of the electronic device 10, and the like. As a specific example, the method 130 may be performed at least in part by the processor 12 executing the RF control software 110. While the method 130 is described using steps in a specific sequence, it should be understood that the present disclosure contemplates that the described steps may be performed in different sequences than the sequence illustrated, and certain described steps may be skipped or not performed altogether.

In process block 132, the processor 12 receives a GNSS tune request 120 for antenna tuning of the shared antenna 55 (e.g., an antenna that is capable of receiving at least GNSS signals and cellular signals) to an L1 band frequency (e.g., 1575.42 MHz) and/or an L5 band frequency (e.g., 1176.45

MHz). In particular, the processor 12, in the form of the baseband processor 114, may receive the GNSS tune request 120 from an application processor of the electronic device 10. In some embodiments, the processor 12 may determine a frequency or frequency band (e.g., the L1 band or the L5 band) for receiving GNSS signals based on the GNSS tune request 120.

In process block 134, the processor 12 tunes the shared antenna 55 to the GNSS L1 band or L5 band frequency. The processor 12 may also activate (e.g., turn on) the GNSS L1 receiver 108 and/or the GNSS L5 receiver, such that the GNSS L1 receiver 108 and/or GNSS L5 receiver may receive and/or process GNSS signals (e.g., from a GNSS satellite).

In process block 136, the processor 12 receives a cellular tune request 118 for antenna tuning of the shared antenna (e.g., to a specified cellular frequency). In particular, the processor 12 may receive the cellular tune request 118 from an application processor of the electronic device 10. In some embodiments, the processor 12 may determine a cellular frequency for the cellular tune request 118, and determine whether the cellular frequency interferes with GNSS L1 and/or GNSS L5 band signals. For example, the processor 12 may determine, based on the cellular frequency associated with the cellular tune request, that the cellular frequency would severely attenuate the L1 band signals received at the shared antenna. That is, the processor may determine that a signal quality of the attenuated GNSS L1 band signal is below GNSS L1 receiver 108 acquisition and/or tracking threshold values.

In process block 138, the processor 12 tunes the shared antenna 55 to the specified cellular frequency and enables the cellular transceiver 104. The processor 12 may also deactivate or blank the GNSS L1 receiver 108 and/or the GNSS L5 receiver 106, for example, based on the determined signal interference. That is, the processor 12 may determine to deactivate or blank the GNSS L1 receiver 108 and/or the GNSS L5 receiver 106 based on the cellular tune request information (e.g., type of cellular request, duration of request).

In this manner, unnecessary power output due to processing attenuated GNSS signals received by the GNSS L1 receiver 108 and/or the GNSS L5 receiver 106 may be mitigated by deactivating and/or blanking the GNSS L1 receiver 108 and/or GNSS L5 receiver 106 when tuning the shared antenna 55 to perform cellular tune requests 118.

Figure 7:
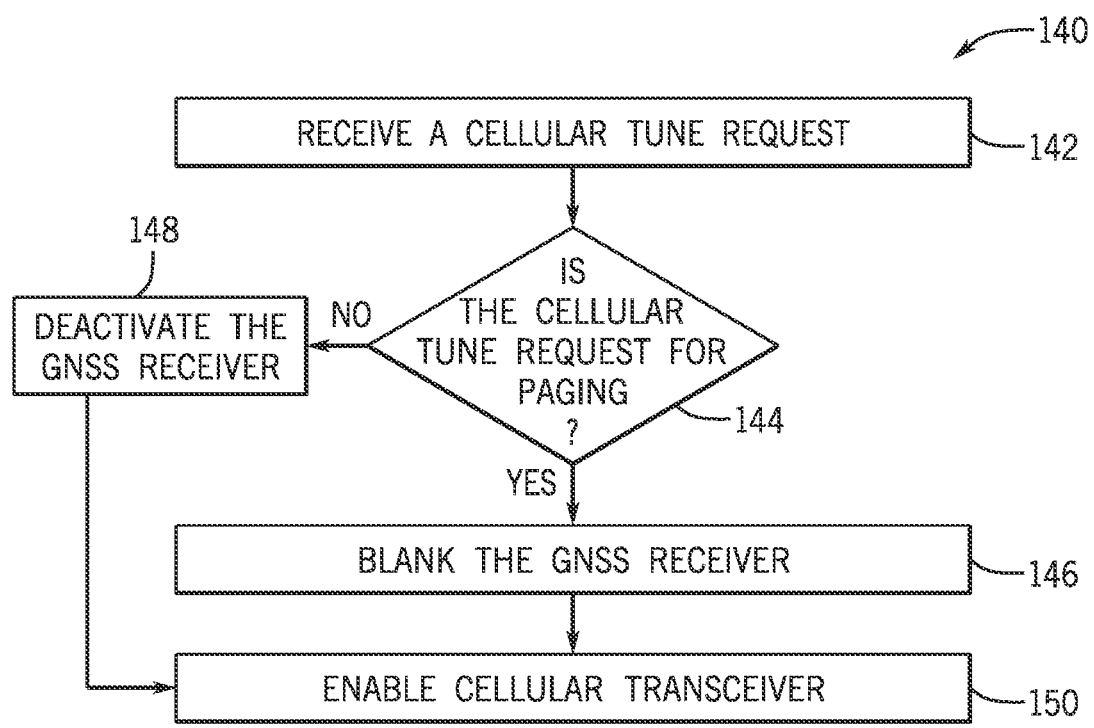
FIG. 7 is a flowchart for tuning an antenna shared by the cellular transceiver and the GNSS receiver of FIG. 5 based on a cellular operation, according to embodiments of the present disclosure.

With the foregoing in mind, FIG. 7 is a flowchart of method 140 for tuning an antenna 55 shared by the cellular transceiver 104 and the GNSS receiver (e.g., 106, 108) as shown in FIG. 5 based on a cellular operation, according to an embodiment of the present disclosure. Any suitable device (e.g., a controller) that may control components of the electronic device 10, such as the processor 12 (e.g., baseband processor 114), may perform the method 140. In some embodiments, the method 140 may be implemented by executing instructions stored in a tangible, non-transitory, computer-readable medium, such as the memory 14 or storage 16, using the processor 12. For example, the method 140 may be performed at least in part by one or more software components, such as an operating system of the electronic device 10, one or more software applications of the electronic device 10, and the like. As a specific example, the method 140 may be performed at least in part by the processor 12 executing the RF control software 110. While the method 140 is described using steps in a specific sequence, it should be understood that the present disclosure contemplates that the described steps may be performed in different sequences than the sequence illustrated, and certain described steps may be skipped or not performed altogether.

In process block 142, the processor 12 receives a cellular tune request 118 for antenna tuning of the shared antenna 55 (e.g., an antenna that is capable of receiving at least GNSS signals and cellular signals) to a cellular frequency. In particular, the processor 12, in the form of the baseband processor 114, may receive the cellular tune request 118 from an application processor of the electronic device 10. In some embodiments, the processor 12 may determine the cellular frequency or frequency band based on the cellular tune request 118.

In decision block 144, the processor 12 determines whether the cellular tune request 118 corresponds to a paging operation. For example, when the electronic device 10 is in a cellular idle state (e.g., performing GNSS operations), the cellular transceiver 104 may perform periodic paging operations on a cadence of every few seconds (e.g., 1.28 sec) to monitor for paging messages from base stations or cellular network operators to determine whether there is incoming data from the cellular network. These periodic paging operations may result in periodic detuning of the GNSS receivers 106, 108 at the shared antenna 55 for a short duration (e.g., 1-10 ms).

If the processor 12 determines that the request is a paging operation, the processor 12, at process block 146, blanks the GNSS L1 receiver 108 and/or GNSS L5 106 receiver. In some embodiments, the processor 12 blanks the GNSS L1 receiver 108 and/or GNSS L5 receiver 106 based on determining whether the cellular frequency interferes with the GNSS frequency (e.g., the L1 band and/or the L5 band). In particular, the processor 12 may blank a GNSS receiver 106, 108 by replacing received GNSS signals with "dummy" signals, such as "zeroing out" the signals by replacing the GNSS L1 receiver 108 and/or GNSS L5 receiver 106 with signals having only zeroes. As such, the GNSS signals may be processed by a GNSS receiver 106, 108 with little or no additional power output from RF and/or digital components of the GNSS receiver 106, 108.

If the processor 12 determines, at process block 148, that the cellular tune request 118 is not a paging operation (e.g., that the cellular tune request 118 corresponds to a long duration cellular operation), the processor 12 deactivates the GNSS L1 receiver 108 and/or the GNSS L5 106 receiver. It should be understood that the paging operation is an example of a short duration cellular operation, and any suitable operation may be substituted for or added to the paging operation. For example, the paging operation may be substituted with any cellular operation that takes at least 2 seconds to complete, 1 second to complete, 100 ms to complete, 10 ms to complete, 5 ms to complete, 1 ms to complete, 0.5 ms to complete, and so on.

At process block 150, the processor 12 enables the cellular transceiver 104 to send and/or receive and/or process the cellular signals received by the shared antenna 55. Blanking a GNSS receiver 106, 108 based on short duration cellular operations (e.g., the paging operation) may prevent latency and excess power output in the GNSS receiver 106, 108 during short duration cellular tune requests.

In some embodiments, a first cellular tune request 118 may be received, the corresponding cellular operation may be completed, and then, after a short time duration (e.g., greater than 1 picosecond, greater than 1 nanosecond, greater than 1 ms, between 1 ms and 10 seconds), a second cellular tune request 118 may be received again at the processor 12 after the short duration. In some cases, a GNSS tune request 120 may be received by the processor 12 during performance of the first cellular tune request 118 (e.g., and thus may be queued) or during the short duration (e.g., when no cellular tune request 118 is received). This may result in the shared antenna 55 being tuned to the GNSS frequency and activation of the GNSS receivers 106, 108 for the short duration, only to have to disable the GNSS receivers 106, 108, after the short duration due to the second cellular tune request 118. Unnecessary or excessive power may be output due to activating and deactivating the GNSS receivers 106, 108 for such short time periods over the short time durations.

Figure 8:
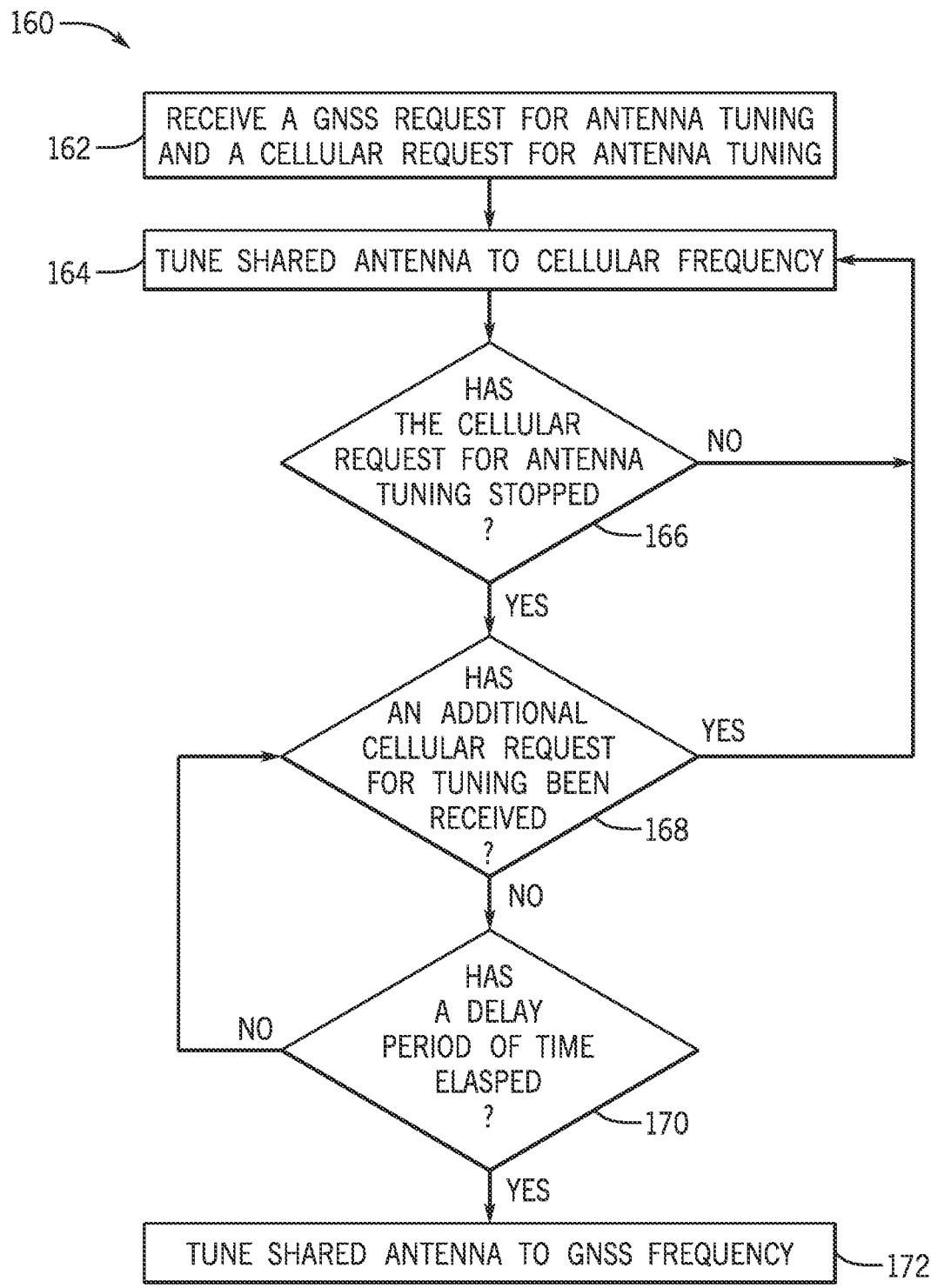
FIG. 8 is a flowchart for tuning an antenna shared by the cellular transceiver and the GNSS receiver of FIG. 5 by delaying tuning to the GNSS receiver, according to embodiments of the present disclosure.

Based on the discussions above, FIG. 8 is a flowchart of a method 160 for tuning an antenna 55 shared by the cellular transceiver 104 and the GNSS receiver 106, 108 of FIG. 5 by delaying tuning to the GNSS receiver 106, 108, according to an embodiment of the present disclosure. Any suitable device (e.g., a controller) that may control components of the electronic device 10, such as the processor 12 (e.g., baseband processor 114), may perform the method 160. In some embodiments, the method 160 may be implemented by executing instructions stored in a tangible, non-transitory, computer-readable medium, such as the memory 14 or storage 16, using the processor 12. For example, the method 160 may be performed at least in part by one or more software components, such as an operating system of the electronic device 10, one or more software applications of the electronic device 10, and the like. As a specific example, the method 160 may be performed at least in part by the processor 12 executing the RF control software 110. While the method 160 is described using steps in a specific sequence, it should be understood that the present disclosure contemplates that the described steps may be performed in different sequences than the sequence illustrated, and certain described steps may be skipped or not performed altogether.

In process block 162, the processor 12 receives a GNSS tune request 120 for antenna tuning of the shared antenna 55 (e.g., an antenna that is capable of receiving at least GNSS signals and cellular signals) to the L1 band frequency (e.g., 1575.42 MHZ) and/or L5 band frequency (e.g., 1,176.45 MHz) and concurrently receives a cellular tune request 118 for shared antenna tuning to a cellular frequency. In particular, the processor 12, in the form of the baseband processor 114, may receive the cellular tune request 118 and the GNSS tune request 120 from an application processor of the electronic device 12. In some embodiments, the processor 12 may determine the cellular frequency or frequency band based on the cellular tune request 118.

In process block 164, the processor 12 tunes the one or more shared antennas 55 of the communication circuitry 100 to the cellular frequency. In some embodiments, the processor 12 may also blank and/or deactivate the GNSS L1 receiver 108 and/or GNSS L5 receiver based on determining whether the cellular frequency interferes with the GNSS frequency (e.g., the L1 band and/or the L5 band).

In decision block 166, the processor 12 determines if the cellular tune request 118 has stopped (e.g., whether a cellular operation associated with the cellular tune request 118 has been completed) or if the cellular tune request 118 has continued. If the processor 12 continues to receive the cellular tune request 118 from an application processor of the electronic device 10, the processor 12, at process block 164, continues to tune the shared antenna 55 to the cellular frequency.

If the processor 12 determines that the cellular tune request 118 has stopped, in decision block 168, the processor 12 determines if an additional cellular tune request 118 has been received. If the processor 12 determines that an additional cellular tune request 118 has been received, at process block 164, the processor 12 tunes the shared antenna 55 to the cellular frequency that corresponds to the additional cellular tune request 118.

If the processor 12 determines that no additional cellular tune request 118 has been received, at decision block 170, the processor 12 determines if a specified delay time period has elapsed. The delay time period to any suitable time period that may avoid unnecessary and/or excessive power output due to activating and deactivating the cellular transceiver 104 and/or the GNSS receiver 106, 108 during the time period, such as the time for cellular paging (e.g., between 1 ms and 10 ms). The delay time period may also be determined by the quality of GNSS L1 signals and/or GNSS L5 signals received at the shared one or more antennas 55. For example, the cellular tune frequency may not cause interference and result in a degraded signal for both the GNSS L1 band signal and the GNSS L5 band signal. In this case, since both signals are generally unaffected by the shared antenna 55 tuning to the cellular frequency, the delay time period may be extended because the GNSS signals may still be processed and location of the electronic device 10 determined during cellular tuning operations. In another case, both the GNSS L1 signal and the GNSS L5 signal may be degraded due to the cellular tune frequency at the shared antenna 55. In this case the delay time period may be shorter, such that the location of the electronic device 10 may be obtained more rapidly during cases where cellular tuning is not necessary.

If the processor 12 determines that the delay period of time has not elapsed without an additional cellular tune request 118 being received, at decision block 168, the processor 12 continues to monitor if an additional cellular tune request 118 has been received by the processor 12. If the processor 12 determines that the delay period of time has elapsed without an additional cellular tune request 118 being received, the processor 12, at process block 172, tunes the shared antenna 55 to the GNSS frequency and activates and/or enables the GNSS L1 receiver 108 and/or GNSS L5 106 receiver.

The method 160 may be implemented to mitigate unnecessary tuning and/or activation of the GNSS receiver 106, 108 for short durations. For example, the electronic device 10 may be utilized to stream music via cellular operation and provide route directions via GNSS operation. As such, the electronic device 10 may tune the shared antenna 55 according to the cellular tune request 118 to stream music on the electronic device 10. The electronic device 10 may stop transmitting the cellular tune request 118 during short time periods, such as when a user of the electronic device 10 may be selecting an additional song, and may resume streaming music after the short time period. To prevent unnecessary tuning of the shared antenna 55 to a GNSS frequency during the short time period, only to return to tuning to a cellular frequency after the short time period and mitigate unnecessary power output for short term activation and deactivation of the GNSS L1 receiver 108 and/or GNSS L5 receiver 106, the electronic device 10 may implement the delay period for shared antenna tuning.

As mentioned above, the electronic devices 10 may receive low earth orbit (LEO) satellite signals on a LEO satellite transmit frequency band (e.g., 1610-1618.725 megahertz (MHz)) that may interfere with the L1 band for GNSS signal reception. This may result in interference with the GNSS signals received by one or more antennas 55 tuned to the L1 band. Additionally, governmental bodies and other regulatory bodies may implement restrictions on LEO satellite communication according to certain geographical areas, such as requiring that the electronic device 10 deactivate a LEO transceiver 102 and halt LEO satellite communication in the certain geographical areas.

Figure 9:
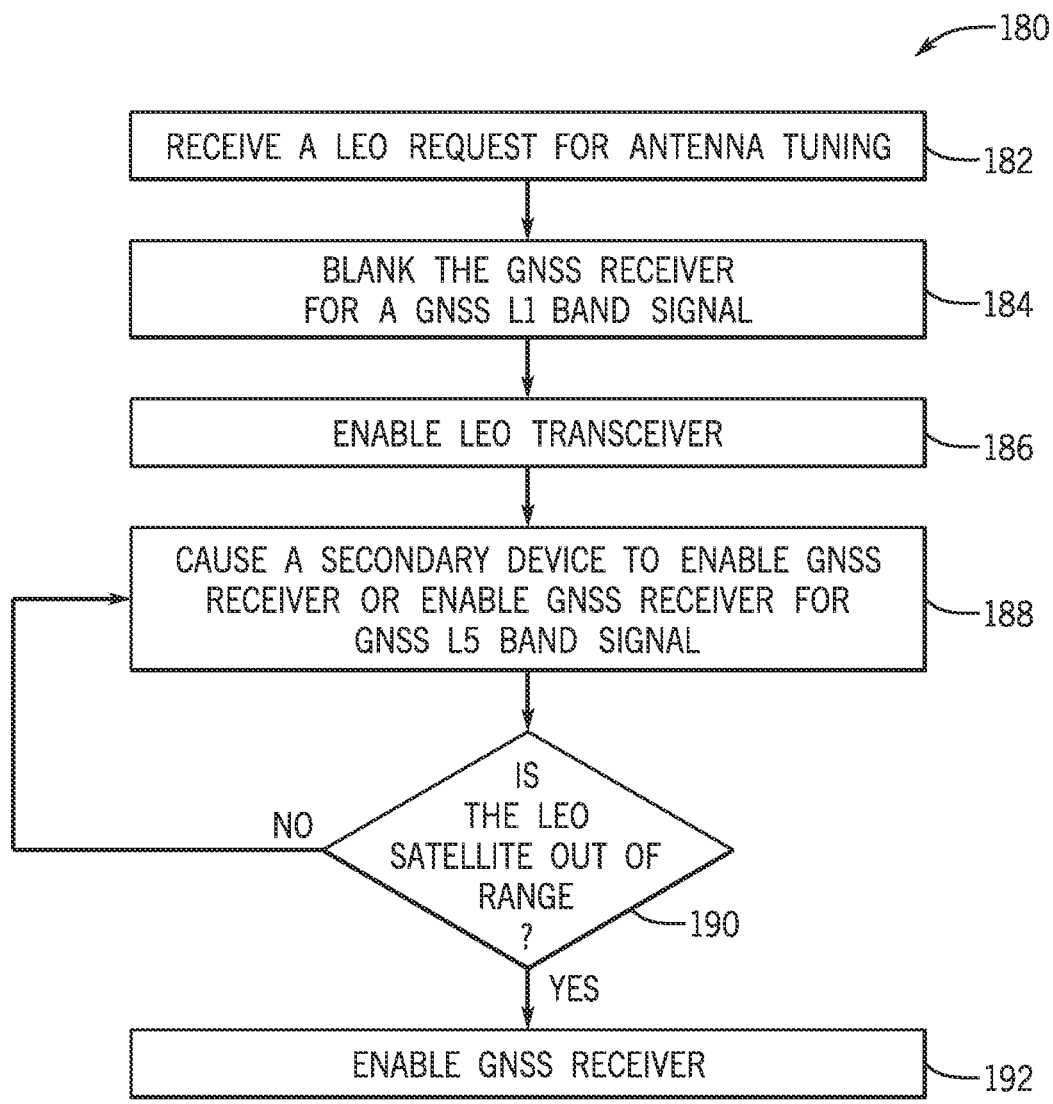
FIG. 9 is a flowchart for tuning an antenna shared by a Low Orbit Satellite (LEO) transceiver and a GNSS receiver as shown in FIG. 5, according to embodiments of the present disclosure.

With the foregoing in mind, FIG. 9 is a flowchart of method 180 for tuning an antenna shared by a Low Orbit Satellite (LEO) transceiver 102 and a GNSS receiver 106. 108 as shown in FIG. 5, according to an embodiment of the present disclosure. Any suitable device (e.g., a controller) that may control components of the electronic device 10, such as the processor 12 (e.g., baseband processor 114), may perform the method 180. In some embodiments, the method 180 may be implemented by executing instructions stored in a tangible, non-transitory, computer-readable medium, such as the memory 14 or storage 16, using the processor 12. For example, the method 180 may be performed at least in part by one or more software components, such as an operating system of the electronic device 10, one or more software applications of the electronic device 10, and the like. As a specific example, the method 180 may be performed at least in part by the processor 12 executing the RF control software 110. While the method 180 is described using steps in a specific sequence, it should be understood that the present disclosure contemplates that the described steps may be performed in different sequences than the sequence illustrated, and certain described steps may be skipped or not performed altogether.

In process block 182, the processor 12 receives a LEO satellite tune request 122 for antenna tuning of the one or more antenna 55 (e.g., an antenna that is capable of receiving at least LEO signals) to a LEO satellite frequency (e.g., 2483.5-2500 MHZ). In particular, the processor 12, in the form of the baseband processor 114, may receive the LEO satellite tune request 122 from an application processor of the electronic device 10. Additionally, in response to receiving the LEO satellite tune request 122, the processor 12 may receive GNSS signals via the one or more antennas 55 tuned to the GNSS L1 band and/or the GNSS L5 band, to determine an initial time and local oscillator frequency offset for acquiring the LEO satellite signal.

In process block 184, the processor 12 blanks the GNSS L1 receiver 108 (e.g., in response to receiving LEO satellite tune request 122). The GNSS L1 receiver 108 may be blanked to mitigate receiving and/or processing degraded GNSS L1 signals resulting from high power LEO satellite transmissions causing interference with the L1 band for GNSS signal reception. That is, the processor 12 may replace the GNSS L1 signals with a dummy signal (e.g., zeroes), such that the GNSS L1 receiver 108 receives the dummy signal instead of the degraded GNSS L1 signals. In some embodiments, the processor 12 may deactivate or turn off the GNSS L1 receiver 108 instead of blanking the GNSS L1 receiver 108. In process block 186, the processor 12 enables and/or activates the LEO transceiver 102 to receive the LEO satellite signals.

In process block 188, the processor 12 may enable and/or activate the GNSS L5 receiver 106 to allow for GNSS signal processing for the electronic device 10. In some embodiments, the processor 12 may send instructions to a secondary device (e.g., a smartphone, a smartwatch, a laptop, a tablet, and so on) associated with or communicatively coupled to the electronic device 10 to cause a GNSS receiver of the secondary device to receive GNSS signals and transmit the GNSS signals to the electronic device 10. Additionally, the electronic device 10 may transmit the initial time and local oscillator frequency offset calculated based on the GNSS signals to the LEO satellite. The LEO satellite may utilize the initial time and local oscillator frequency offset to progressively degrade time and frequency uncertainties based on clock stability parameters. In some embodiments, the GNSS L5 receiver 106 may receive GNSS signals on the L5 frequency band on a first set of antennas of the one or more antennas 55, the GNSS L1 receiver 108 may receive GNSS signals on the L1 frequency band on a second set of antennas of the one or more antennas 55, and the LEO transceiver 102 may send and receive LEO satellite signals on a third set of antennas of the one or more antennas 55, where the first set, second set, and third set of antennas include different antennas. However, in some embodiments, the second set of antennas used to receive the GNSS signals on the L1 frequency band may be the same as the third set of antennas used to send and receive LEO satellite signals.

In decision block 190, the processor 12 determines whether the LEO satellite is out of range (e.g., for communications to be performed with the LEO satellite). In some embodiments, the processor 12 may determine whether a signal received from the LEO satellite is weak, nonexistent, or has a signal quality or power below a threshold signal quality or power. In additional or alternative embodiments, the electronic device 10 may store a map of LEO satellite trajectories, and may determine whether a location of the electronic device 10 (e.g., based on the received GNSS signals) is not within range of a LEO satellite. If the processor 12 determines that the LEO satellite is out of range, at process block 192, the processor 12 enables the GNSS L1 receiver 108 based on the LEO satellite no longer transmitting to the electronic device 10. That is, the processor 12 may stop blanking the GNSS L1 signals or replacing the GNSS L1 signals with a dummy signal (e.g., zeroes), and thus enable the GNSS L1 receiver 108 to receive the GNSS L1 signals. In embodiments where the processor 12 deactivates or turns off the GNSS L1 receiver 108 (e.g., in process block 184), then the processor 12 may activate or turn on the GNSS L1 receiver 108. The processor 12 may also deactivate the LEO transceiver 102. If the processor 12 determines that the LEO satellite is still within a communication range, at process block 188, the processor 12 continues to enable the GNSS L5 receiver 106 or the GNSS receiver of the secondary device. In this manner the GNSS L1 receiver 108 may avoid unnecessary power output due to processing a noisy GNSS L1 signal caused by LEO satellite communication interference, which may result in a loss of GNSS L1 signal tracking due to degraded signal quality.

Figure 10:
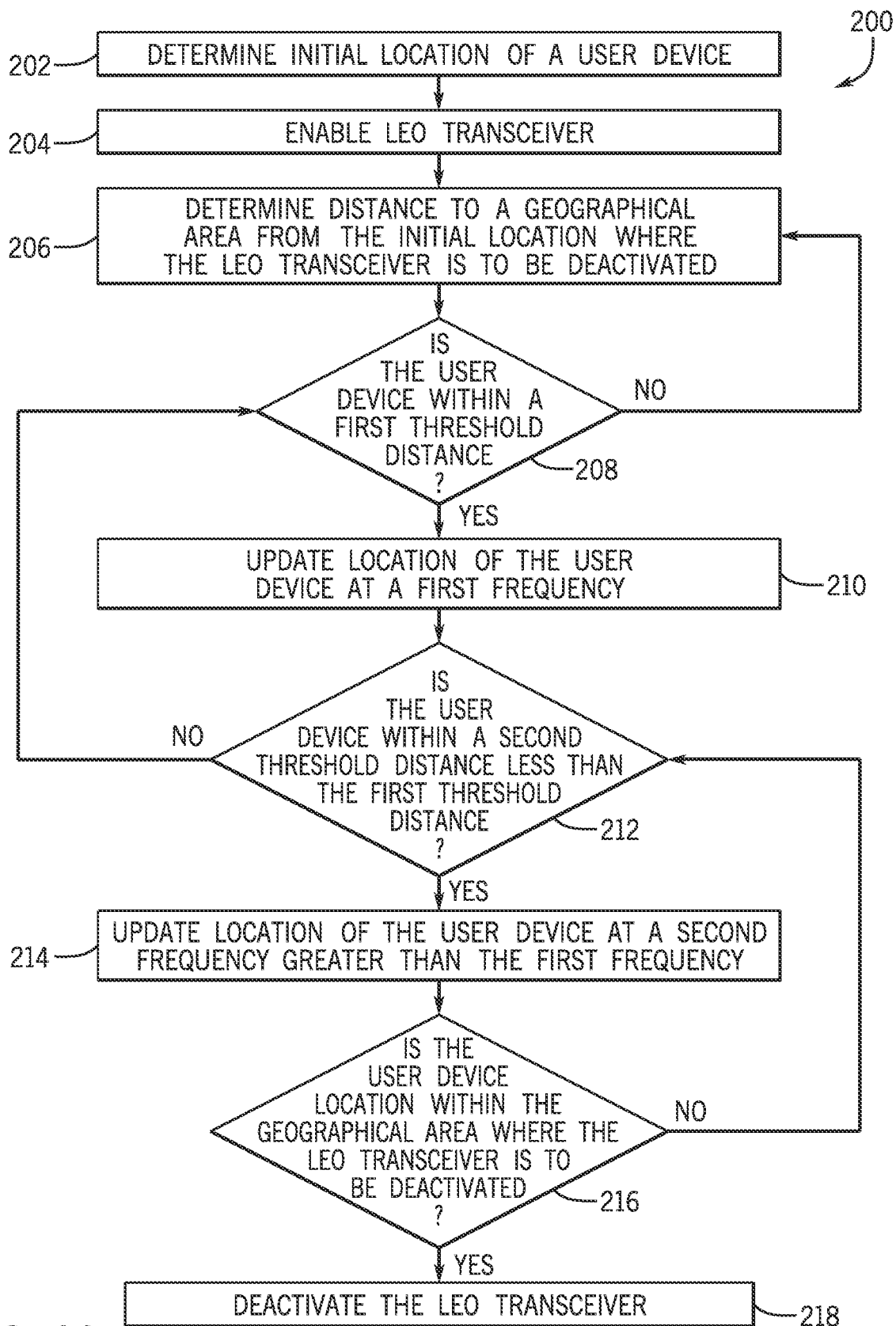
FIG. 10 is a flowchart for deactivating a LEO transceiver of FIG. 5 based on a location of the electronic device of FIG. 1, according to embodiments of the present disclosure.

With the foregoing in mind, FIG. 10 is a flowchart of method 200 for deactivating the LEO transceiver 102 of FIG. 5 based on a location of the electronic device of FIG. 1, according to embodiments of the present disclosure. Any suitable device (e.g., a controller) that may control components of the electronic device 10, such as the processor 12 (e.g., baseband processor), may perform the method 200. In some embodiments, the method 200 may be implemented by executing instructions stored in a tangible, non-transitory, computer-readable medium, such as the memory 14 or storage 16, using the processor 12. For example, the method 200 may be performed at least in part by one or more software components, such as an operating system of the electronic device 10, one or more software applications of the electronic device 10, and the like. As a specific example, the method 200 may be performed at least in part by the processor 12 executing the RF control software 110. While the method 200 is described using steps in a specific sequence, it should be understood that the present disclosure contemplates that the described steps may be performed in different sequences than the sequence illustrated, and certain described steps may be skipped or not performed altogether.

In process block 202, the processor 12 determines an initial location of the electronic device 10. In particular, the processor 12 may receive GNSS signals using a GNSS receiver 106, 108, and determine the initial location of the electronic device 10 based on the received GNSS signals. At process block 204, the processor 12 enables the LEO transceiver 102 to send and receive LEO satellite signals. In some embodiments, the processor 12 may enable the LEO transceiver 102 after determining that the electronic device 10 is within communication range of the LEO satellite, as described in decision block 190 of method 180 in FIG. 9. Additionally or alternatively, the processor 12 may determine that LEO satellite communication may be performed by the electronic device 10 according to satellite transmission regulations corresponding to the initial location of the electronic device 10.

In process block 206, the processor 12 determines a distance to one or more geographical areas from the initial location where the LEO transceiver 102 is to be deactivated based on territory and/or country regulations for LEO satellite transmissions. As discussed above, governmental bodies and other regulatory bodies may implement restrictions on LEO satellite communication according to certain geographical areas, such as requiring that the electronic device 10 deactivate a LEO transceiver 102 and halt LEO satellite communication in the certain geographical areas. The processor 12 may store the geographical areas in the memory 14 to track when the electronic device 10 may be approaching a restricted LEO satellite area.

In decision block 208, the processor 12 may determine whether the electronic device 10 is within a first threshold distance to the geographical areas where LEO satellite use is restricted. That is, the processor 12 may determine a shortest distance that the electronic device 10 is to a restricted LEO satellite area, and determine whether that distance is within the first threshold distance. In particular, the processor 12 may utilize GNSS L5 signals due to LEO satellite transmission signal interferences with the GNSS L1 band. During operation of the LEO transceiver 102, the GNSS L5 receiver 106 may be enabled initially to determine location information. The first threshold distance may include any suitable distance that may be indicative of the electronic device 10 being sufficiently close enough to a restricted LEO satellite area to warrant regular checking or tracking the electronic device 10 to see if the electronic device 10 has entered the restricted LEO satellite area. For example, the first threshold distance may be greater than 100 meters (m), 200 m, 500 m, 1 kilometer (km), 2 km, 5 km, 10 km, and so on. During LEO satellite communication, the GNSS L5 receiver 106 may implement a duty cycle (e.g., deactivate GNSS L5 receiver 106 for certain periods of time) to save power after initial location is determined. Duty cycle of the GNSS L5 tracking may be based on time and frequency uncertainty propagation and pull-in range of the LEO satellite transceiver 102. The stability of the clock (e.g., 1 parts per million (ppm) stable clock) enables a time duration of four minutes to stay within +/−250 microseconds of time uncertainty necessary to maintain L5 tracking capability. The LEO satellite time/frequency lock (e.g., when LEO satellite is tracking) may further increase duration of the duty cycle depending on the LEO satellite capabilities.

If the processor 12 determines that the LEO satellite is within the first threshold distance to the restricted LEO satellite areas, then, at process block 210, the processor 12 increases the GNSS L5 tracking duty cycle to a greater frequency and/or increase the frequency of received GNSS signals from the secondary device. This may be to ensure that the electronic device 10 does not enter restricted LEO areas. The increased frequency of the GNSS signals received at the processor 12 may be determined based on the first threshold distance to the restricted LEO satellite area. For example, the frequency of GNSS signals received at the processor 12 may be a frequency less than 1 second (sec), 5 sec, 10 sec, 1 minute (min), 5 min, 10 min, and so on. The frequency determined by the processor 12 may be based on the first threshold distance, such that a greater first threshold distance to the restricted LEO area may result in a lesser frequency (e.g., a determined first threshold distance of 2 km may correspond to a frequency of 10 min and a determined first distance of 200 m corresponds to a frequency interval of 1 min). The first frequency may be any suitable frequency that can receive GNSS signals at intervals that correspond to less than the time estimate to the shortest distance to reach the restricted LEO satellite areas from the first threshold distance. If the processor 12 determines that the electronic device 10 is not within the first threshold distance based on the GNSS signals, at process block 206, the processor 12 decreases the frequency of the GNSS L5 tracking duty cycle due and/or frequency of received secondary device GNSS signals due to distance to the LEO satellite restricted areas from the electronic device 10 increasing. That is, because the electronic device 10 is not sufficiently close enough to a restricted LEO satellite area to warrant regular checking or tracking the electronic device 10 to see if the electronic device 10 has entered the restricted LEO satellite area, checking or tracking the electronic device 10 may be performed less frequently (e.g., at a lower duty cycle).

In decision block 212, the processor 12 determines if the electronic device 10 is within a second threshold distance less than the first distance to the geographical areas where LEO satellite use is restricted. That is, the processor 12 may determine a shortest distance that the electronic device 10 is to a restricted LEO satellite area, and determine whether that distance is within the second threshold distance. The second threshold distance may be less than the first threshold distance, and may include any suitable distance that may be indicative of having to increase the frequency of checking or tracking the electronic device 10 to see if the electronic device 10 has entered the restricted LEO satellite area, as the electronic device 10 is near or sufficiently close to the restricted LEO satellite area. For example, the first threshold distance may be less than 10 km, 5 km, 2 km, 1 km, 500 m, 200 m, 100 m, and so on. If the processor 12 determines that the LEO satellite is within the second threshold distance to the restricted LEO satellite areas the processor 12, at process block 214, increases the GNSS L5 tracking duty cycle to a second frequency greater than the first frequency, based on the electronic device 10 approaching the restricted area for LEO satellite signal communication. As discussed, above the second frequency may be a greater frequency than the first frequency. For example, the second frequency may be a frequency greater than 1 sec, 5 sec, 10 sec, 1 min, 5 min, 10 min, and so on based on the first frequency value determined and the second threshold distance. The second frequency may be any suitable frequency that can enable the processor 12 to receive GNSS signals at intervals that correspond to less than the time estimate to the shortest distance to reach the restricted LEO satellite areas from the second threshold distance. If the processor 12 determines that the electronic device 10 is not within the second threshold distance, at decision block 208, the processor 12 determines the distance of the electronic device 10 relative to the first threshold (e.g., based on receiving GNSS signals).

In decision block 216, the processor 12 determines if the electronic device 10 is within a geographical area where the LEO satellite communication is restricted. If the processor 12 determines that the electronic device 10 is within the restricted area, the processor 12, at process block 218, deactivates the LEO transceiver 102. If the processor 12 determines that the electronic device 10 is not within the within the restricted area, the processor 12 returns to decision block 212 and determines the distance of electronic device 10 relative to the second threshold.

The method 200 enables the electronic device 10 to monitor the device location relative to geographical areas that restrict LEO satellite access based on regulatory requirements, and increases the frequency of checking the device location using the GNSS L5 receiver 106 to ensure that the electronic device 10 does not enter the geographical areas while the LEO transceiver 102 is active. The method may also reduce unnecessary power output by decreasing the frequency of checking the device location using the GNSS L5 receiver 106 when the electronic device 10 is further away from a restricted area. Additionally, the average duty cycle implemented by the GNSS L5 receiver 106 in the disclosed embodiments may enable between 5 and 15 milliamperes of current draw savings for the electronic device 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. An electronic device comprising:
   a plurality of antennas;
   a cellular transceiver configured to send and receive cellular signals via one or more antennas of the plurality of antennas;
   a global navigation satellite system (GNSS) receiver configured to receive GNSS signals via the one or more antennas; and
   one or more processors configured to
      receive a GNSS tune request to receive the GNSS signals via the one or more antennas at a GNSS signal frequency,
      in response to receiving the GNSS tune request, receive, using the GNSS receiver, the GNSS signals via the one or more antennas at the GNSS signal frequency,
      receive a cellular tune request to send or receive the cellular signals via the one or more antennas at a cellular frequency, and
      in response to receiving the cellular tune request, deactivate the GNSS receiver, and send or receive, using the cellular transceiver, the cellular signals via the one or more antennas at the cellular frequency.

2. The electronic device of claim 1, wherein the cellular tune request comprises a duration that the cellular transceiver uses the one or more antennas, the one or more processors being configured to deactivate the GNSS receiver in response to determining that the duration exceeds a threshold duration.

3. The electronic device of claim 1, wherein the cellular frequency and the GNSS signal frequency are between 1164 megahertz and 1189 megahertz.

4. The electronic device of claim 1, wherein the cellular tune request comprises a duration that the cellular transceiver is using the one or more antennas, the one or more processors being configured to blank the GNSS receiver in response to determining that the duration is below a threshold duration.

5. The electronic device of claim 1, wherein the GNSS signal frequency is within an L1 frequency band or an L5 frequency band.

6. The electronic device of claim 1, wherein the one or more processors are configured to determine a location of the electronic device based on the GNSS signals.

7. A method comprising:
   receiving, at processing circuitry of an electronic device comprising a plurality of antennas, a global navigation satellite system (GNSS) tune request to receive GNSS signals via one or more antennas of the plurality of antennas at a GNSS signal frequency;
   in response to receiving the GNSS tune request, receiving, using a GNSS receiver of the electronic device, the GNSS signals via the one or more antennas at the GNSS signal frequency;
   receiving, by the processing circuitry, a cellular tune request to send or receive cellular signals via the one or more antennas at a cellular frequency; and
   in response to receiving the cellular tune request, deactivating the GNSS receiver, and sending or receiving, using a cellular transceiver of the electronic device, the cellular signals via the one or more antennas at the cellular frequency.

8. The method of claim 7, wherein the cellular tune request comprises a duration that the cellular transceiver uses the one or more antennas.

9. The method of claim 8, comprising, in response to determining that the duration is below a first threshold value, blanking the GNSS receiver.

10. The method of claim 8, comprising, in response to determining that the duration is above a first threshold value, deactivating the GNSS receiver.

11. The method of claim 7, wherein the GNSS signal frequency is within an L1 frequency band or an L5 frequency band.

12. The method of claim 7, wherein the cellular frequency and the GNSS signal frequency are between 1164 megahertz and 1189 megahertz.

13. One or more tangible, non-transitory, computer-readable media storing instructions that, when executed by processing circuitry, cause the processing circuitry to
   receive a global navigation satellite system (GNSS) tune request to receive GNSS signals via one or more antennas and a GNSS receiver at a GNSS signal frequency;
   receive, using the GNSS receiver, the GNSS signals via the one or more antennas at the GNSS signal frequency based on the GNSS tune request;

receive a cellular tune request to communicate cellular signals via the one or more antennas using a cellular transceiver at a cellular frequency, and deactivate the GNSS receiver, and communicate, using the cellular transceiver, the cellular signals via the one or more antennas at the cellular frequency based on the cellular tune request.

14. The one or more tangible, non-transitory, computer-readable media of claim 13, wherein the cellular tune request comprises a duration that the cellular transceiver uses the one or more antennas.

15. The one or more tangible, non-transitory, computer-readable media of claim 14, comprising, in response to determining that the duration is below a first threshold value, blanking the GNSS receiver.

16. The one or more tangible, non-transitory, computer-readable media of claim 14, comprising, in response to determining that the duration is above a first threshold value, deactivating the GNSS receiver.

17. The one or more tangible, non-transitory, computer-readable media of claim 13, wherein the GNSS signal frequency is within an L1 frequency band.

18. The one or more tangible, non-transitory, computer-readable media of claim 13, wherein the GNSS signal frequency is within an L5 frequency band.

19. The one or more tangible, non-transitory, computer-readable media of claim 13, wherein the cellular frequency is between 1164 megahertz and 1189 megahertz.

20. The one or more tangible, non-transitory, computer-readable media of claim 13, wherein the GNSS signal frequency is between 1164 megahertz and 1189 megahertz.

\* \* \* \* \*